E. H. LAMIELL.
RIM TOOL.
APPLICATION FILED NOV. 2, 1917.
1,360,415.
Patented Nov. 30, 1920.
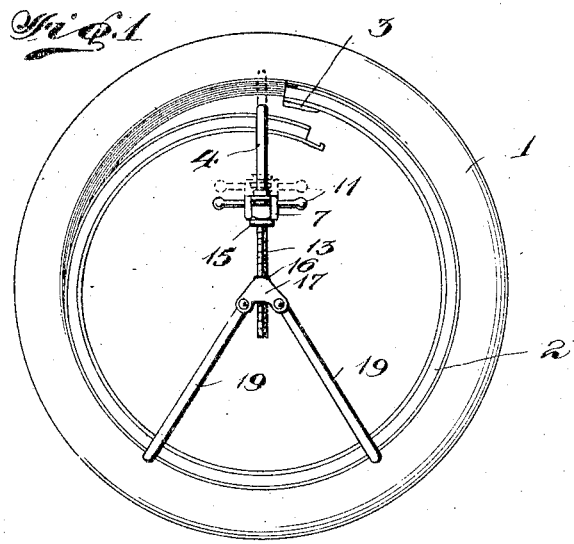
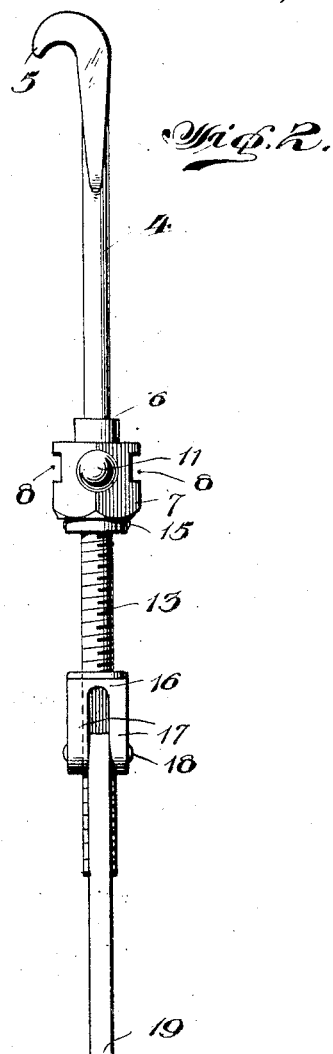
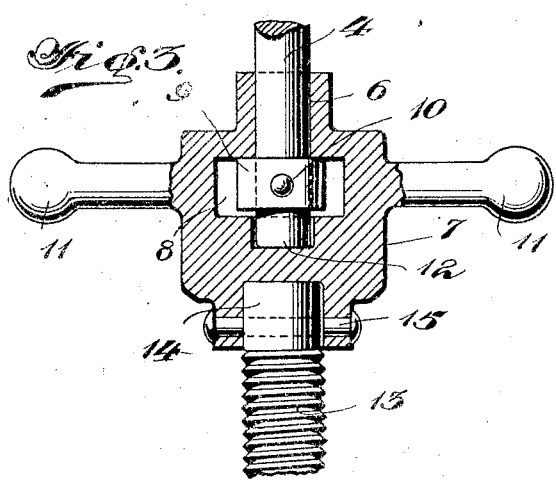
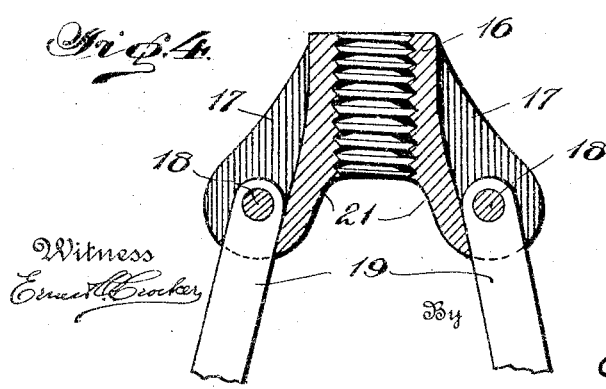
Witness
Ernest Crocker
Inventor
Earl H. Lamiell
By F. W. Bond
Attorney

UNITED STATES PATENT OFFICE.

EARLD H. LAMIELL, OF CANTON, OHIO.

RIM-TOOL.

1,360,415.　　　　Specification of Letters Patent.　　Patented Nov. 30, 1920.

Application filed November 2, 1917. Serial No. 199,815.

*To all whom it may concern:*

Be it known that I, EARLD H. LAMIELL, a citizen of the United States, residing at Canton, in the county of Stark and State of Ohio, have invented a new and useful Rim-Tool, of which the following is a specification.

The present invention relates to improvements in rim tools and has more especial reference to a tool adapted to contract or expand a demountable rim for automobile tires.

The object of the present invention is to provide a tool whereby the demountable rims for automobile tires and the like may be contracted and held in such contracted position while the outer casing and inner tube are being removed and replaced thereon, thus rendering the operation easy.

A further object of the present invention is the provision of a rim tool provided with a plurality of rim engaging members, one of which is adjustable and so constructed as to permit the operation thereof to contract or expand the rim of an automobile tire or the like.

A still further object is the provision of a tool of this character which may be applied to the rim of an automobile tire or the like for the purpose of expanding said rim.

A still further object is the provision of a simple and inexpensive tool of this character which is easily and readily adjustable to rims of various sizes and which is simple and inexpensive in construction and durable and efficient in use.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the accompanying drawings:

Figure 1 is a view illustrating my improved rim tool in position upon a rim, showing the rim in the contracted position, dotted lines showing the tool and rim in the initial position.

Fig. 2 is a side elevation of the rim tool upon an enlarged scale.

Fig. 3 is a sectional view through the rotating head showing a portion of the adjusting screw and the movable rod.

Fig. 4 is a sectional view through the nut showing a portion of the pivoted arms attached thereto.

Similar numerals of reference indicate corresponding parts throughout the several figures of the drawing.

Referring more especially to the construction illustrated in the accompanying drawings, the numeral 1 indicates a tire casing of any usual and well known form which is mounted upon an ordinary demountable rim 2, which is split at 3 in the usual manner in order to facilitate the removal of the tire therefrom or the replacing of a new tire thereon. My improved rim tool comprises the rod 4 which is provided at its outer extremity with a claw 5 adapted to engage the outer edge of the rim, the other extremity of said rod being rotatably mounted within a sleeve 6 which is formed upon the rotatable head 7, said head being provided with a socket 8, which receives the collar 9, said collar being mounted upon the extremity of the rod 4 by means of a pin 10 or the like.

Diametrically opposed fingers 11 are formed rigid upon the rotating head 7 for the purpose of rotating said head as will be hereinafter described and a bearing 12 is formed in the head to receive the lowermost extremity of the rod 4 in order to prevent any side movement of said rod.

The upper end of the adjusting screw 13 is located in a socket 14 formed in the rotatable head a pin 15 holding said screw against rotation with relation to the head. The screw 13 is located through the nut 16, said nut being provided upon diametrically opposite sides with spaced ears 17 between each pair of which is pivotally mounted by means of a pin 18, an arm 19, each of said arms being provided at its free extremity with a claw 20 arranged to engage the rim. The nut is provided at its lower end with the downwardly depending and outwardly flared walls 21 which are located between the ears 17 and arranged to be engaged by the arms 19 as shown in Fig. 4 to limit the movement of said arms in one direction.

When it is desired to contract the rim in order to remove a tire casing therefrom the rim 2 is adjusted to the size of the rim by turning the head 7. The claw 5 upon the rod 4 is hooked over the rim near the split therein and the claws 20 of the arms 19 are hooked over the opposite side of the rim, said arms being given a wide spread as shown in Fig. 1 so as to assure an even pull from three points on the rim. The rotatable head 7 is then given a few turns bringing the end of the rim to which the claw 5 is attached down into the position shown in Fig. 1 when the rim can be easily lifted out of the tire casing and a new casing placed upon the rim after which the rotatable head may be loosened allowing the tool to be removed from the rim. The tool is then adjusted to the inside diameter of the rim and the two arms 19 are brought as close together as possible and one placed upon either side of the split in the rim, the rod 4 being located diametrically opposite the split. The rim can then be forced back into the normal position by a few turns of the rotatable head. When the tool is not in use the arms 19 are folded back against the adjusting screw and rod 4 thus making a compact structure which may be easily contained within the ordinary automobile tool box.

I claim:—

1. In a rim tool of the character described, the combination of a nut, a pair of arms pivotally connected to said nut, rim engaging claws upon the free extremities of said arms, a screw located through said nut, a rotatable head fixedly mounted upon said screw, a rod swiveled in said head and a rim engaging claw upon said rod.

2. In a rim tool of the character described, the combination of a nut, a pair of arms pivotally connected to said nut, projections formed upon said nut to limit the movement of said arms in one direction, rim engaging claws upon the free extremities of said arms, a screw located through said nut, a rotatable head fixedly mounted upon said screw, a rod swiveled in said head and a rim engaging claw upon said rod.

3. A rim contracting and expanding tool comprising a pair of pivoted arms to be secured upon a split rim opposite the meeting ends thereof, a nut connected to said arms, a screw located through said nut, a rotatable head fixedly connected to said screw and an arm swiveled in said head and arranged to be secured to the split rim adjacent the meeting ends thereof.

In testimony that I claim the above I have hereunto subscribed my name.

EARLD H. LAMIELL.